(12) United States Patent
Wei et al.

(10) Patent No.: US 10,579,665 B2
(45) Date of Patent: Mar. 3, 2020

(54) USING STATUS INDICATORS IN AN ITEM CACHING ENVIRONMENT

(71) Applicant: Microsoft Technology Licensing, LLC, Redmond, WA (US)

(72) Inventors: Yawen Wei, Sunnyvale, CA (US); Kaiyang Liu, Bellevue, WA (US); Jie Xiao, Sunnyvale, CA (US); Divye Khilnani, Sunnyvale, CA (US); Nihar Mehta, Sunnyvale, CA (US); Mingyuan Zhong, Sunnyvale, CA (US); Dayun Li, Sunnyvale, CA (US); Siyu You, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 423 days.

(21) Appl. No.: 15/445,715

(22) Filed: Feb. 28, 2017

(65) Prior Publication Data

US 2018/0246981 A1    Aug. 30, 2018

(51) Int. Cl.
*G06F 17/30* (2006.01)
*G06F 16/435* (2019.01)
*G06F 16/172* (2019.01)

(52) U.S. Cl.
CPC ......... *G06F 16/435* (2019.01); *G06F 16/172* (2019.01)

(58) Field of Classification Search
CPC .............................. G06F 16/435; G06F 16/172
See application file for complete search history.

(56) References Cited

U.S. PATENT DOCUMENTS

| | | | |
|---|---|---|---|
| 9,317,470 B1* | 4/2016 | Raley | G06F 15/167 |
| 2011/0022471 A1* | 1/2011 | Brueck | G06Q 30/02 705/14.61 |
| 2012/0239638 A1* | 9/2012 | Bennett | G06F 16/5838 707/710 |
| 2014/0068196 A1* | 3/2014 | Benoit | H04L 67/2852 711/135 |
| 2016/0065576 A1* | 3/2016 | Zhang | G06F 16/2455 726/3 |
| 2017/0302753 A1* | 10/2017 | Larumbe | H04L 67/2842 |

* cited by examiner

*Primary Examiner* — Huawen A Peng
(74) *Attorney, Agent, or Firm* — Hickman Palermo Becker Bingham LLP (57) ABSTRACT

A media item cache manager system which implements techniques for efficiently using cache memory to respond to requests. The cache memory may include information on items along with a status indicator for each of the items, indicating different status information. Some examples of possible status indicators include valid, invalid, or in-progress indicators.

20 Claims, 4 Drawing Sheets

USING STATUS INDICATORS IN AN ITEM CACHING ENVIRONMENT

RELATED CASES

This application is related to the following applications: (1) U.S. patent application Ser. No. 15/445,451, "Increasing Coverage of Responses for Requests through Selecting Multiple Native Content Items," filed on Feb. 28, 2017; (2) U.S. patent application Ser. No. 15/445,781, "Multi-Step Validation of Content Items based on Dynamic Publisher Requirements," filed on Feb. 28, 2017; (3) U.S. patent application Ser. No. 15/445,742, "Reducing Load to Downstream Services by Filtering Requests," filed on Feb. 28, 2017; and (4) U.S. patent application Ser. No. 15/445,791, "Progress Tracking for Requests Made Through an Intermediary," filed on Feb. 28, 2017. These applications are hereby incorporated by reference in their entirety, for all purposes.

TECHNICAL FIELD

The present disclosure relates to data processing and, more specifically, to efficiently referencing data stored as cache data. SUGGESTED GROUP ART UNIT: 2161; SUGGESTED CLASSIFICATION: 707/795.

BACKGROUND

The availability of various content items on the Internet allows access to information in bulk. However, the sheer volume of content items available does not increase the usefulness of the content items. The information presented in the content items themselves should be relevant to each user. For example, a user interested in learning about current political developments may request content items. Content items with information on living and style may be irrelevant to the user, even though the same content item may be enjoyable for another user.

Other than matching relevant content items to users' requests, the volume of content items has also made it difficult to select and provide content items in a timely manner. For example, if a content item is not provided within certain time criteria, then a user may have a poor Website experience (e.g., slowly loading Web pages, incorrectly rendered Web pages) or other undesirable effects. Users may grow frustrated and choose to never view content items from that Website again, even if the content items are particularly relevant.

To increase the speed of responding to requests in a request processing system, cache memory may be used. For example, cache memory may be used to store content items or pieces of content items. However, cache memory is limited by the size of the memory available to the cache and how efficiently the cache memory stores, selects, and retrieves information.

Therefore, it is desirable to have improved methods to match users with content items within specified time constraints by using cache memory efficiently.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline. The outline and headings used in the outline are provided merely for reference purposes. Features discussed following each heading do not limit the features as being required by a specific embodiment identified by each heading and do not limit the features as solely belonging to any specific embodiment identified by each heading.

1.0 GENERAL OVERVIEW
    1.1 NATIVE CONTENT ITEMS
    1.2 MEDIA ITEMS
    2.0 STRUCTURAL OVERVIEW
    3.0 EXAMPLE METHOD FOR USING A CACHE
    3.1 DETERMINE WHETHER CACHE RESULT IS USABLE
    3.2 UNUSABLE CACHE RESULT
    3.3 MEDIA ITEMS RETRIEVED SIMULTANEOUSLY
    4.0 EXAMPLE METHOD FOR PRELOADING INFORMATION
    4.1 AVAILABLE TIME TO RESPOND TO REQUEST
    4.2 RELATED MEDIA ITEMS
    5.0 EXAMPLE EMBODIMENT OF A MEDIA ITEM CACHE MANAGER SYSTEM
    6.0 IMPLEMENTATION EXAMPLE—HARDWARE OVERVIEW

1.0 General Overview

A media item cache manager system is described herein which implements techniques for efficiently using cache memory to respond to requests received by a request processing system. The cache memory may include information on media items along with a status indicator for each of the media items, indicating different status information. Some examples of possible status indicators include valid, invalid, or in-progress indicators.

1.1 Native Content Items

The following is a sample use case of the media item cache manager system used with requests for content items that are dynamically published on a Web page. Although the specification may employ examples using this sample embodiment discussed below, the principles as described herein are generally applicable to other types of systems where there are requests that need to be satisfied within (or regardless of) a particular time constraint.

In an embodiment, the request processing system may be used to respond to requests where content items are used as part of a dynamically published Web page. These content items may also be known as native content items, an example type of which is advertisements. Native content items are different than other content items since, instead of specifying the requirements for a single element to be displayed on a Web page, native content items include two or more media items that will be combined for display on a Web page. Each native content item may include different media item requirements (e.g., information specifying what media items with which types are needed and technical requirements for the media items). Further, requirements information may include targeting information (e.g., information specifying whether a content item should be returned) and, for media items used to generate the native content item,

1.2 Media Items

Media items may include any piece of content that may be displayed on a computer screen. Some examples of different types of media items include text, graphic, or video. Media items may also include additional information that is not displayable on a computer screen. Some examples include addressing information (e.g., a universal resource locator), identifying information on a content item provider that provided the media item, or other pieces of information.

A single native content item may include one or more media items. For example, media items may be associated with one or more types. The type for a media item defines where, for a native content item, the media item may be used. Some examples of types include an icon image, a logo image, a main image, a title, a call-to-action (CTA), a sponsor, a description, or many other types. Different requests for native content items may require one or more of these types to be satisfied. For example, a native content item request may include a requirement for a logo image, a title, and a sponsor.

Some examples of media item requirements in addition to type include a limit on the dimensions for a graphic element (e.g., pixel count, resolution, height, length, width), a text element (e.g., character count, text length), or a video element (e.g., pixel count, resolution, height, length, width, video quality, playback time). For example, the request processing system may include two or more media items with the type of logo. This means that, for requests that require a logo to be included, the two or more media items may possibly satisfy the requirement. However, there may be size, color, theme, or other attributes where the two or more logos differ. Some logos may be wider, while other logos may be narrower. Based on the requirements included with the request, the proper logo may be selected. As another example, a request may require a length of 15 characters for a company name. If there is a media item that satisfies the length requirement (15 characters) and type requirement (is a company name), it may be selected as part of the response to the request.

Further, additional changes may be applied to a selected media item after its selection. For example, in addition to the length requirement, before the media item is displayed as part of a Web page, the font, color, media item size, or other attribute of the media item may be modified.

The flexibility of using different media items depending on a request allows the reuse of media items (e.g., when a media item is selected for use with two or more native content items) as well as allowing a Web page to maintain a consistent "look and feel" (e.g., making sure content items properly fit in a specified space). However, this means that native content items lack predefined requirements of what media items should be used. For example, there may be preferred requirements such as fonts, lengths, sizes and other attributes for media items used in native content items. TABLE 1 below includes, in an embodiment of the request processing system, technical requirements for different media item types.

TABLE 1

| Media Item Type (media item category) | Technical Requirements |
| --- | --- |
| Icon image (graphic) | 320 × 180 pixels, 128 × 128 pixels, 80 × 80 pixels |
| Logo image (graphic) | 128 × 128 pixels, 80 × 80 pixels, 48 × 48 pixels |
| Main image (graphic) | 1200 × 627 pixels, 1000 × 750 pixels, 600 × 314 pixels, 300 × 157 pixels |
| Title (text) | 25 characters, 20 characters |
| Call to action (text) | 25 characters, 15 characters |
| Sponsor (text) | 25 characters |
| Description (text) | 100 characters, 90 characters, 72 characters |
| Video | video duration (e.g., 15 seconds, 30 seconds, 1 minute, or other time); video bitrate; video aspect ratio; supported media file format (e.g., mp4, WebM, others) |

If a content provider includes media items that comply with these requirements, then the chances of the content provider being able to properly respond to requests will increase. Since these are merely suggestions, however, conforming to these requirements may still mean that the content provider may not satisfy all possible requirements.

Further, native content items may be subject to a higher failure rate than other types of content items generated in response to a request. This is because the time to select media items to produce a content item for a dynamically published Web page is the same or similar to non-dynamically published Web pages. By using status indicators, the media item cache manager system may increase the chance of timely selecting media items. For example, a status indicator may indicate that a media item stored in a cache is usable or, if it is not usable, what can be done to retrieve the media item within a specified time frame.

2.0 Structural Overview

Figure 1:
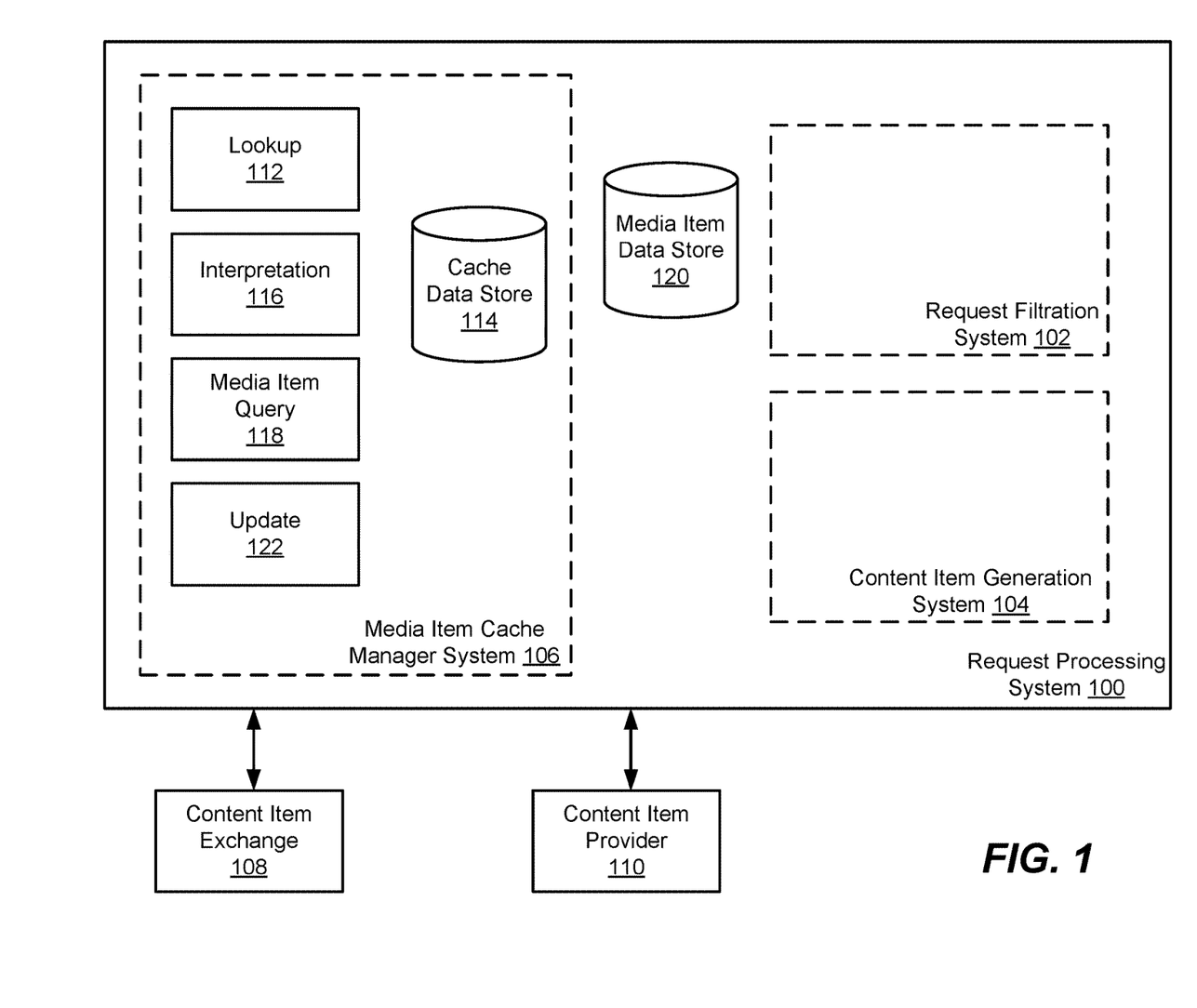
FIG. 1 illustrates a request processing system in which the techniques described may be practiced according to certain embodiments.

FIG. 1 illustrates a request processing system 100 in which one or more of techniques described herein may be practiced according to certain embodiments. The request processing system 100 is a computer-based system. The various components of the request processing system 100 are implemented at least partially by hardware at one or more computing devices, such as one or more hardware processors executing instructions stored in one or more memories for performing various functions described herein. For example, descriptions of various components (or modules) as described in this application may be interpreted as providing pseudocode, an informal high-level description of one or more computer structures. The descriptions of the components may be converted into software code, including code executable by an electronic processor. The request processing system 100 illustrates only one of many possible arrangements of components configured to perform the functionality described herein. Other arrangements may include fewer or different components, and the division of work between the components may vary depending on the arrangement.

The request processing system 100 includes three separate systems that may operate in tandem or separately in the request processing system 100 to select content items: a request filtration system 102, a content item generation system 104, and a media item cache manager system 106. Although these systems include components divided into separate systems, the systems may communicate with each other or use information generated by other systems, or components within each system may be rearranged differently than the arrangements shown in FIG. 1. Further, different embodiments of the request processing system 100 may include one, two, or all three of these systems, in different combinations, depending on specific needs of the request processing system 100.

The request filtration system 102 may be responsible for reducing load in the request processing system 100, by reducing the number of requests to which the request processing system 100 responds. For example, the request filtration system 102 implements techniques to reduce load on a downstream service by filtering requests before they are processed by the downstream service. The request filtration system 102 may be used by the request processing system 100 to eliminate requests that satisfy one or more filters. Each filter may specify one or more attributes that may apply to one or more requests. If a request satisfies any applicable filter, then the request is not considered by the downstream service or a content item does not need to be selected by the request processing system 100 in response to the request. An example of the request filtration system 102 that may be used with the request processing system 100 is described in the related U.S. Patent Application titled "Reducing Load to Downstream Services by Filtering Requests," as identified above in the Related Cases section of this application.

The content item generation system 104 is responsible for selecting and identifying content items to return in response to a request. For example, the content item generation system 104 may separate requirements included with a request into first and second sets of requirements. The first set of requirements may be used to identify which content items or content item campaigns may be suitable to respond to the request. The second set of requirements may be used to determine whether items associated with the selected content items or content item campaigns correspond to technical requirements associated with (e.g., specified in) the request. An example of a content item generation system 104 that may be used with the request processing system 100 is described in the related U.S. Patent Application titled "Multi-Step Validation of Content Items based on Native Content Item Requirements" and U.S. Patent Application titled "Increasing Coverage of Responses for Requests through Selecting Multiple Native Content Items," as identified above in the Related Cases section of this application.

A content item exchange 108 represents an entity that supplies requests of content items to the request processing system 100. There may be one or more content item exchanges that provide requests to the request processing system 100 that are not shown in FIG. 1. Each content item exchange may provide, to the request processing system 100, requests for one or more different media item types. For example, the content item exchange 108 may be a real-time bidding (RTB) content item exchange. The RTB content item exchange allows different parties to bid for impressions on one or more Web pages. A winner of a bid obtains the right to include the winner's content item on the one or more Web pages. The winner of the bid may be any party that offers that highest value to the content item exchange 108, such as revenue, content item suitability, or other factors determined by the content item exchange 108. One content item exchange may provide requests for video, text, graphical, native video, native text, native graphical, or any combination of these media item types.

A content item provider 110 represents an entity that supplies content items that may be selected for display in response to a request. Different entities may be content item providers. Some examples of entities include organizations, advertisers, persons, companies, and many other types of entities. The content item provider 110 may provide various pieces of information to generate content items, such as media items that are put together to form a content item, or complete content items themselves. The content item provider 110 may provide one or more media items of different types. Some examples of types of media items include audio, image, text, or video. Media items may also be associated with different types that define where they may be used in a content item and different media item types may be used for each type. For example, for a logo field, an image media item may be required, while for a company name, a text media item may be required.

The media item cache manager system 106 may be responsible for storing, in a cache memory (and retrieving from the cache memory), media items that may be used to generate content items in the request processing system 100. A lookup component 112 is responsible for performing lookups to a cache data store 114 to determine whether information on a media item is stored at the cache data store 114. The cache data store 114 may use any suitable data structure, such as a table, linked list, or other data structures. Each cache entry in cache data store 114 includes information about at least one media item, such as the media item itself and any information related to the media item. Media items stored in the cache data store 114 may include a key, a value, a status indicator, and a time to live (TTL).

An interpretation component 116 is responsible for processing results of lookups by the lookup component 112. For example, the interpretation component 116 may determine whether a value stored for a media item in the cache data store 114 is usable.

A media item query component 118 is responsible for making queries to the media item data store 120. The media item data store 120 may be a part of the request processing system 100 as shown in FIG. 1 or may be separate from the request processing system 100. Queries made to the media item data store 120 may take longer than lookups to the cache data store 114.

An update component 122 is responsible for updating the cache data store 114. For example, based on results from the interpretation component 116 or the media item query component 118, update component 122 may update a value, a TTL, a status indicator, or any combination of these for a cache entry.

3.0 Example Method for Using a Cache

Figure 2:
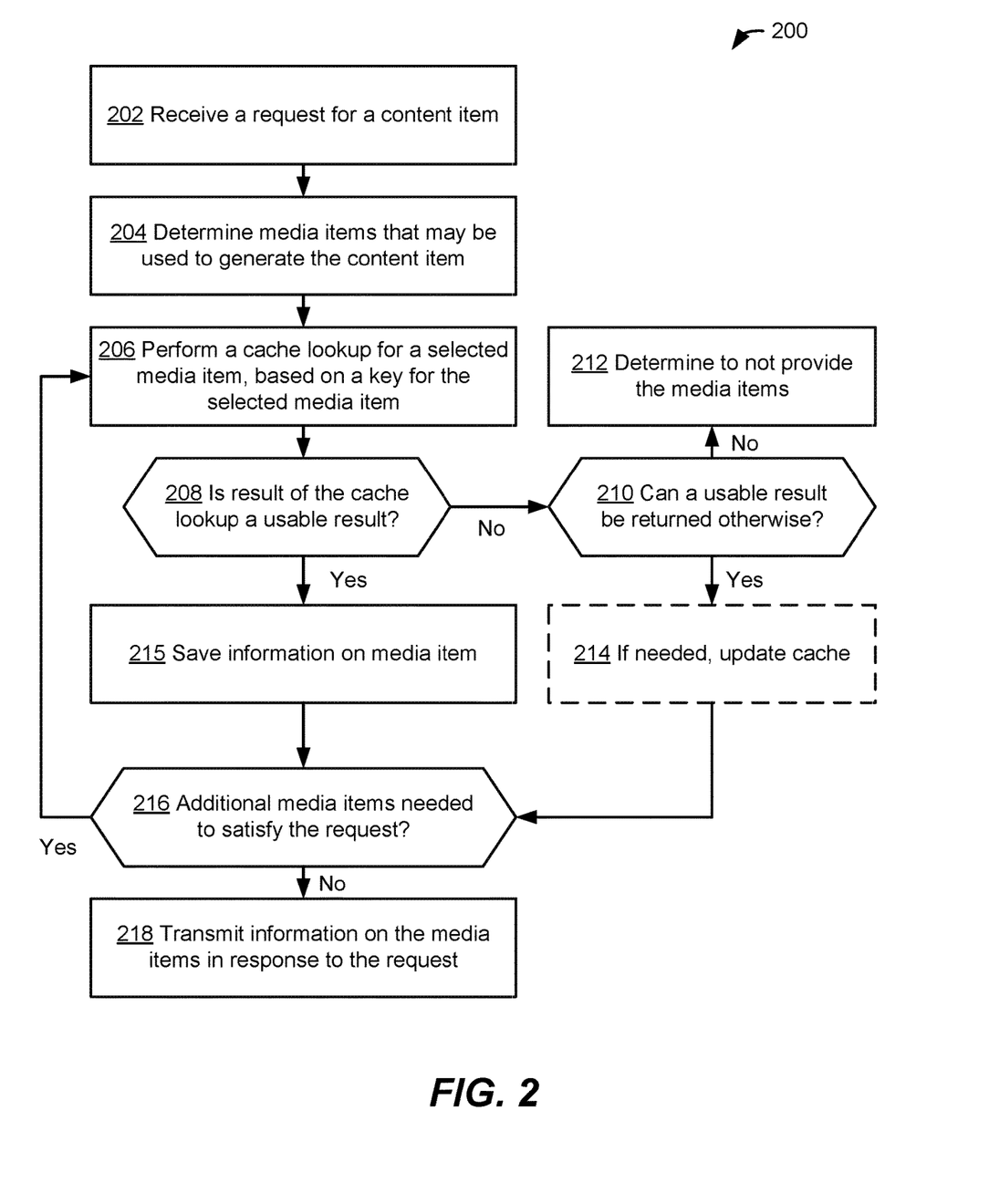
FIG. 2 is a flow that illustrates an example method for using cache memory in the media item cache manager system.
Figure 3:
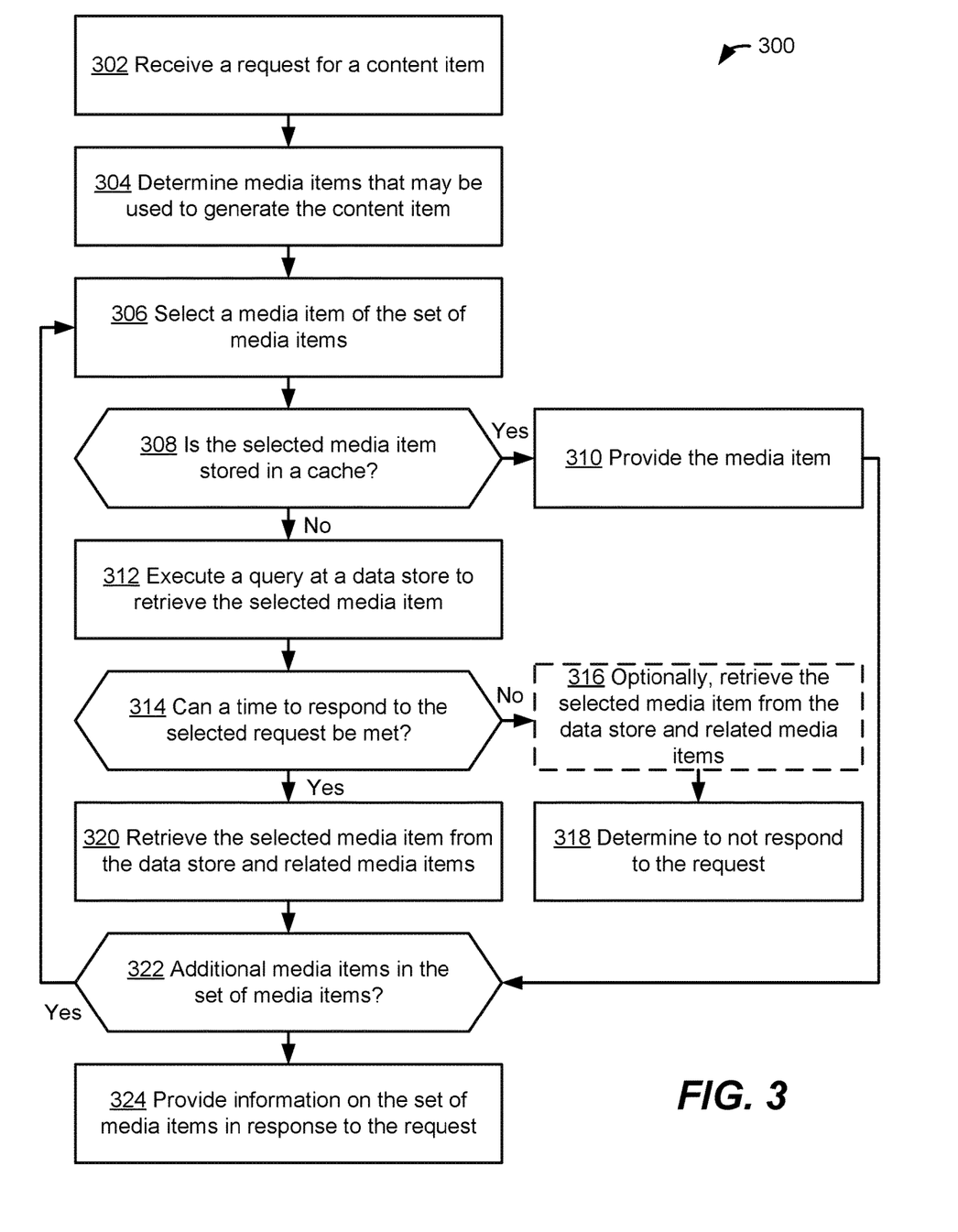
FIG. 3 is a flow that illustrates an example method for preloading information to a cache in the media item cache manager system.

For purposes of illustrating a clear example, FIGS. 2 and 3 are described herein in the context of FIG. 1, but the broad principles of FIGS. 2 and 3 can be applied to other systems having configurations other than as shown in FIG. 1. Further, FIGS. 2 and 3 illustrate an algorithm or plan that may be used as a basis for programming one or more of the components of FIG. 1 that relate to the functions that are illustrated in the diagram, using a programming development environment or programming language that is deemed suitable for the task. Thus, FIGS. 2 and 3 are intended as an illustration at the functional level at which skilled persons, in the art to which this disclosure pertains, communicate with one another to describe and implement algorithms using programming. This diagram is not intended to illustrate every instruction, method object or sub step that would be needed to program every aspect of a working program, but are provided at the high, functional level of illustration that is normally used at the high level of skill in this art to communicate the basis of developing working programs.

FIG. 2 is a flow 200 that illustrates an example method for using cache memory in the media item cache manager system 106. For example, the cache may include status indicators, which provide details on whether information stored in the cache is usable and, if it is not, how to retrieve the information efficiently.

In step 202, the media item cache manager system 106 receives request information. The request information does not need to include all the information received by the request processing system 100 when initially receiving a request for a content item. The request received by the request processing system 100 may be for a native content item. The request may originate from a content item exchange or from a publisher. The request may include a variety of information, such as targeting information on entities that made the requests, where selected content items may appear, or technical information on the requirements needed to satisfy the request. The request information received by the media item cache manager system 106 may be a subset of the information received by the request processing system 100. For example, the request may have included targeting information usable by the request processing system 100 to determine that the content item is suitable to return in response to the request. Instead of having all the information included in the request (e.g., the targeting information), the media item cache manager system 106 may receive information identifying which media items would be needed to produce the content item in response to the request received by the request processing system 100.

In step 204, the media item cache manager system 106 determines media items that may be used to generate the content item. To generate a content item means to select media items that may be used to render the content item. The content item itself does not need to be provided in response to the request, but instead information specifying where selected media items may be retrieved may be provided. For example, a content item provider may provide one or more media items to the request processing system 100. In response to a request for one or more content items, the media item cache manager system 106 may select media items from a content item provider that satisfies the request. The request may specify one or more requirements that media items used to respond to the request must comply with, such as a location within the content item the media item may be used (e.g., type of the media item). The request may specify that a content item that satisfies the request includes a company name (a text type media item), a logo image (an image type media item), and a tag line or comment (a text type media item).

In step 206, the media item cache manager system 106 performs a cache lookup for a selected media item, using a key for the selected media item. For example, each media item of the media item cache manager system 106 includes a key identifying the media item. The information on which media items needed to generate a content item in response to a request are included in the request information from the step 202. The request information may include the keys themselves or information that may be processed to determine what keys should be used, such as a campaign identifier related to specific media items. Using the key for the selected media item, a cache lookup is performed, such as looking in a cache table to determine whether there is an entry for the key in the cache table.

3.1 Determine Whether Cache Result is Usable

In step 208, the media item cache manager system 106 determines whether a result of the cache lookup is a usable result. There may be a variety of reasons why the result may or may not be a usable result. One reason why there may not be a usable result is that there may be no entry in the cache that corresponds to the key. There may be no entry when the cache is newly established, so that there are none or few media items stored in the cache. As another example, the cache may previously have stored an entry with information associated with the key, but the information has been removed from the cache as part of a cleaning process of the cache where, for example, entries have been flushed or deleted if their contents have been in cache for a certain period of time or their contents have not been accessed for a certain period of time.

Even if there is a result or entry in the cache corresponding to the key, the result may be usable or unusable. In an embodiment, the media item cache manager system 106 includes entries in the cache, each entry with a status indicator and a time to live (TTL). The status indicator and/or the TTL may affect whether information in a cache entry is usable. TABLE 1 below includes, in an embodiment of the media item cache manager system 106, how a status indicator in combination with an indication of whether a TTL has expired may affect the usability of information in the cache.

TABLE 2

|  | Success | Failure | In-Progress |
| --- | --- | --- | --- |
| TTL Not Expired | Usable cache value. Return value in cache. | Cache miss. Return error or other indication that the media item cannot be retrieved. | Wait then try cache lookup again. If success status indicator, then return cache value. If fail or in-progress, then return error or other indication that the media item cannot be retrieved. |
| TTL Expired | Execute query to retrieve value from data store and change status to in-progress. If response time exceeds an available time but value can be retrieved, then update cache with value, TTL, and status indicator. If response time is within the available time, then return value. | | |

If, in step 208, the media item cache manager system 106 determines that the cache value is usable, then, in step 215, the media item cache manager system 106 saves information on the usable media item. This may include saving value information (e.g., a location where the media item may be retrieved) for the selected media item. The value information for the selected media item may be saved until value information for all the media items required to respond to a request are retrieved.

3.2 Unusable Cache Result

If, in step 208, the media item cache manager system 106 determines that the result is unusable, then, in step 210, the media item cache manager system 106 determines whether a Usable result may be returned otherwise. Using TABLE 2 as an example, this may correspond to when (1) the TTL for the result has expired or (2) the status indicator is a failure indicator or an in-progress indicator. If, in step 210, the media item cache manager system 106 determines that a usable result cannot be returned, then, in step 212, the media item cache manager system 106 determines that the request for the content item cannot be satisfied. Using TABLE 2 as an example, this may correspond to when (1) the TTL for the result has expired and retrieving the value exceeds an available time to respond to the request or (2) the status indicator is a failure. As discussed in greater detail elsewhere in this application, the available time to respond to a request may be calculated from how much time has elapsed from transmitting of the request to the step 208. This may include time that has not yet been spent, but may be estimated and included in determining whether there is available time to respond.

If, in step 210, the media item cache manager system 106 determines a usable result may be returned without the cache, then, in step 214, the media item cache manager system 106 updates the cache, if needed. Using TABLE 2 as an example, this may correspond to when (1) the TTL for the cached value has expired and retrieving the cached value is within the available Time to respond to the request or (2) the status indicator after waiting due to the in-progress indicator is a success indicator. Different updates may be made to the cache depending on how the usable result was determined, if it is not found in the cache. For example, the TTL for the key may be updated to reflect when the media item was retrieved. Further, the status indicator may be changed depending on the outcome for the media item request. For example, if a result is returned, then a status indicator may be updated to a success indication, a timestamp updated, a value updated, and a TTL updated. The result does not necessarily mean that the result is usable with the present request (e.g., time to respond has expired or predicted to expire before the result is available), but may be usable for subsequent requests to the cache.

In step 216, the media item cache manager system 106 determines whether the request specifies additional media items necessary to respond to the request. If there are additional media items, then the media item cache manager system 106 returns to step 206.

If, in the step 216, there are no additional media items, then the media item cache manager system 106 transmits media item information in response to the request. For example, the response may include the one or more media items or an indication of where each media item is accessible, such as a URL.

3.3 Media Items Retrieved Simultaneously

Embodiments of the media item cache manager system 106 may include processing of media items in parallel or simultaneously. For example, if there are two or more media items needed to respond to a request, all or a part of the two or more media items may be processed by the media item cache manager system 106 at the same time or at least partially overlapping in time. This increases the general throughput of the media item cache manager system 106. For example, instead of retrieving media items sequentially, results may be retrieved faster by retrieving media items in parallel using, for example, two or more threads of execution.

In an embodiment, when media items are being retrieved simultaneously, if the media item cache manager system 106 determines that any of the media items cannot be retrieved for the request, then other retrievals for media items to satisfy the request may cease. For example, incomplete content items (e.g., content items missing one or more media items) cannot be displayed to a user or, even if displayed, would be of low value. Thus, once one media item cannot be retrieved, the entire request may be deemed to have failed. Any other retrievals of media items for the request may cease.

4.0 Example Method for Preloading Information

FIG. 3 is a flow 300 that illustrates an example method for preloading information to a cache in the media item cache manager system 106. When a request processing system 100 receives a request, one or more media items may be selected in response to the request. In addition to the one or more media items selected in response to the request, there may be additional media items that the media item cache manager system 106 may retrieve. These media items do not need to be explicitly selected to satisfy any particular requirement included in the request. This is because when a media item is chosen, other related media items may have a chance to also be needed for subsequent requests. As an example, a request may require a graphic media item. When retrieving the graphic media item from a cache or a data store, the media item cache manager system 106 loads location information for the graphic media item and also location information for other related graphic media items (e.g., graphic media items with different sizes). This may increase overall processing speed in the request processing system 100 since, based on previous requests for a media item, this indicates there is a higher likelihood that related media items to the media item will be requested soon.

In step 302, the media item cache manager system 106 receives a request for a content item. In step 304, the media item cache manager system 106 determines that the request may be satisfied by a set of media items. In step 306, the media item cache manager system 106 selects a media item of the set of media items.

In step 308, the media item cache manager system 106 determines whether the selected media item is stored in a cache. For example, using the key corresponding to the selected media item, a cache table is searched for whether there is an entry that corresponds to the selected media item.

If the media item is in the cache, in step 310, then the media item cache manager system 106 provides the media item from the cache. This may include information on where the media item is found in the cache and not the media item itself. In step 322, the media item cache manager system 106 determines whether there are additional media items in the set of media items. For example, there may be additional media items that require information on where the media item is stored to satisfy the request.

In step 312, the media item cache manager system 106 executes a query at a data store (e.g., media item data store 120) to retrieve the selected media item. The cache may provide data to the media item cache manager system 106 with lower latency than the data store. For example, the data store may be a memory storage device, different than the cache. The memory storage device may be a computer device separate from the one or more computer devices executing the media item cache manager system 106.

4.1 Available Time to Respond to Request

In step 314, the media item cache manager system 106 determines whether the time to respond to the selected request may be met. For example, the request may have originated from a content item exchange. From the time when a request from the content item exchange is transmitted to the time the content item exchange receives a response to the request, there may be different time requirements. Some lengths of time might include 80 milliseconds, 100 milliseconds, or 120 milliseconds. If a response arrives at the content item exchange after this period of time, then the content item exchange may choose to not consider the response, even if the response is otherwise satisfactory.

The media item cache manager system 106 may calculate how much time has elapsed from transmitting of the request, to the time when step 314 is performed, to determine whether there is available time to respond. This may include time that has not yet been spent, but may be estimated and included in whether there is additional time. For example, the media item cache manager system 106 may include, in addition to the response time currently elapsed, an additional time it would take a response to reach the content item exchange. This estimated time to reply is used to determine whether there is additional time to satisfy the request. If there is additional time, then the media item cache manager system 106 may predict that the request may still be satisfied.

In an embodiment, the media item cache manager system 106 makes a prediction, based on previous requests to the data store, on whether the media item may be retrieved within the specified time. For example, if responses to previous requests to the data store took an average of 15 milliseconds, then the media item cache manager system 106 may include the 15 milliseconds to the estimated time to reply.

4.2 Related Media Items

If there is not enough additional time to respond, then, in optional step 316, the media item cache manager system 106 retrieves the selected media item from the data store and related media items. Information on the selected media item and related media items may then be stored in the cache. Related media items may be media items similar to the selected media item, but with one or more differences than the selected media item. For example, a "related media item" may be a media item with a different size, length, quality, or other attribute different than the selected media item. In an embodiment, a related media item is one that includes the same type as the selected media item. The related media items may be media items that were not explicitly requested from the data store for use in responding to the request.

In step 318, the media item cache manager system 106 determines to not respond to the request. For example, the media item cache manager system 106 may indicate to the request processing system 100 to transmit a message to a content item exchange that a content item will not be provided or the media item cache manager system 106 may simply not respond to the content item exchange for the request.

In step 320, the media item cache manager system 106 retrieves the selected media item from the data store and related media items. Information on the selected media item and related media items may then be stored in the cache.

In step 322, the media item cache manager system 106 determines whether there are additional media items in the set of media items. For example, in order to create a content item, there may be one or more media items. If there are additional media items, then they are retrieved by the media item cache manager system 106. In an embodiment, media items may be retrieved simultaneously, as described in greater detail elsewhere in this application.

In step 324, the media item cache manager system 106 provides information regarding the set of media items in response to the request. This may include one or more locations where media items for the content item may be retrieved.

5.0 Example Embodiment of a Media Item Cache Manager System

In an embodiment, the media item cache manager system 106 includes a cache table including entries on results of requests made to a media item data store. Any suitable data structure may be used to implement the cache table, such as a list, queue, table, array, hash table, or many other data structures. The cache table may include various pieces of information on media items, such as a key (e.g., used to identify a media item), a value (e.g., a location from where a media item may be retrieved), a status indicator, a timestamp, and a time to live (TTL).

The media item cache manager system 106 receives request information from one or more content item requesters. The content item requestors may be users viewing Web pages or a content item exchange that aggregates requests from users. For each request, the media item cache manager system 106 determines a media item to include in a response to the request. For example, the response may include a content item to present to a user. The content item may be generated using one or more media items. This may include determining a media item type and a media item dimension for a first media item. A second media item determined in response to the request may be of a different media item type than the first media item. For example, the first media item may be a graphical media item and the second media item may be a text media item.

In various embodiments, the media item cache manager system 106 may use different pieces of information to identify media items. For example, there may be a single key or a composite of keys that correspond to a desired media item. The composite of keys may include one or more of a content identifier with locale information or metadata of the content item (e.g., title, description in that locale language, image URL, logo URL) related to the content item. A single key may include a content provider identifier, such as the content provider's industry category information. The single key or composite of keys may be used in conjunction to identify the desired media item.

For a media item, the media item cache manager system 106 performs a lookup for the media item in the cache table. For example, a table lookup or a database query may be executed in response to the lookup. The media item cache manager system 106 receives a response as a result of the performed lookup, where the response includes a status indicator for the performed lookup. Different status indicators may determine how the media item cache manager system 106 retrieves the media item.

For an in-progress status indicator for the performed lookup, the media item cache manager system 106 determines, based on the in-progress status indicator, to wait for a period of time, without requesting the media item from the media item data store 120. For example, the in-progress status indicator may further include a timestamp of when the in-progress status indicator was set. Based on the period of time to wait and the timestamp, the media item cache manager system 106 determines whether it should wait longer (e.g., the period of time to wait is likely not to expire based on the timestamp) or whether the media item cache manager system 106 should proceed without waiting (e.g., period of time to wait is likely to expire based on the time specified by the timestamp).

The period of time to wait may vary, depending on various factors. In an embodiment, the period of wait is a set amount of time (e.g., 5 milliseconds, 10 milliseconds, 15 milliseconds, or less). The lower the set amount of time, the lower the likelihood that the media item cache manager system 106 may retrieve the value information for a media item. In another embodiment, the period of time to wait is dependent on an expected length of time that executing a query against the media item data store 120 should take. For example, if it is expected that, based on previous queries to the media item data store 120 or test attempts to the media item data store 120, it will take 5 milliseconds to receive a result from the media item data store, then the media item cache manager system 106 may wait for 5 or fewer milliseconds before performing another lookup for the media item. In this example, if the timestamp was set 3 milliseconds ago, then the media item cache manager system 106 may wait just two or a few more milliseconds (e.g., a buffer) (i.e., 5 milliseconds-3 milliseconds).

After the period of time has elapsed, the media item cache manager system 106 performs another lookup to the cache table without requesting the media item from the media item data store. For example, the previous request that caused the status indicator to be in-progress may have completed and updated the cache table. This may be because the in-progress indicator indicates that a previous request to the media item data store has been made. Since a request has already been made to the media item data store for the media item, there is no need for an additional request. This conserves computing resources (e.g., reducing network load with requests) and decreases the possible time to retrieve the media item (e.g., a previously made request to the media item data store will likely complete first).

In an embodiment, after identifying an in-progress status indicator from a first lookup and after the period of time has elapsed, if the second lookup includes a success status indicator, then the media item cache manager system 106 retrieves, from the cache table, information on the media item in response to each request. For example, this may include the media item itself or a URL or other location information specifying where the media item may be retrieved. The location information may be used by a user's computer to retrieve the media item in order to properly render the content item for display.

In an embodiment, for a success status indicator for a first lookup, the media item cache manager system 106 determines whether a time to live (TTL) stored in the cache table and associated with the media item has expired. If the TTL has not expired, then the media item cache manager system 106 retrieves, from the cache table, information on the media item in response to each request.

In an embodiment, for a failure status indicator for a first lookup, the media item cache manager system 106 determines whether a time to live (TTL) stored in the cache table and associated with the media item has expired. If the TTL has expired, then the media item cache manager system 106 executes a query against the media item data store 120 to retrieve the media item. The media item cache manager system 106 changes the failure status indicator for the media item in the cache table to an in-progress status. For example, if a previous request had failed (e.g., network issues, data store errors), then the cache table may indicate that the previous request was unable to be completed (e.g., using a failure status indicator). The failure status indicator may indirectly reflect the result of previous requests, but does not necessarily include the reason why the previous results may have failed.

However, if the TTL has expired, then the failure status indicator may be stale. In other words, the reason that caused the previous request to fail may have been remedied and the data store should be tried again.

If the query results in a valid result, then the media item cache manager system 106 changes the failure status indicator for the media item in the cache table to a valid status indicator. The media item cache manager system 106 updates the cache table with the valid result of the executed query against the media item data store. If the query returns an invalid result, then the media item cache manager system 106 updates the cache table with a time to live (TTL) associated with the media item. For example, the TTL may be extended in this case, since the data store has failed to return the media item information at least twice.

In an embodiment, if the media item cache manager system 106 fails to identify the media item in the cache, then the media item cache manager system 106 executes a query against the media item data store to retrieve the media item. For example, the cache table may have recently started storing media items or the media item may be a media item that had not been recently requested.

6.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
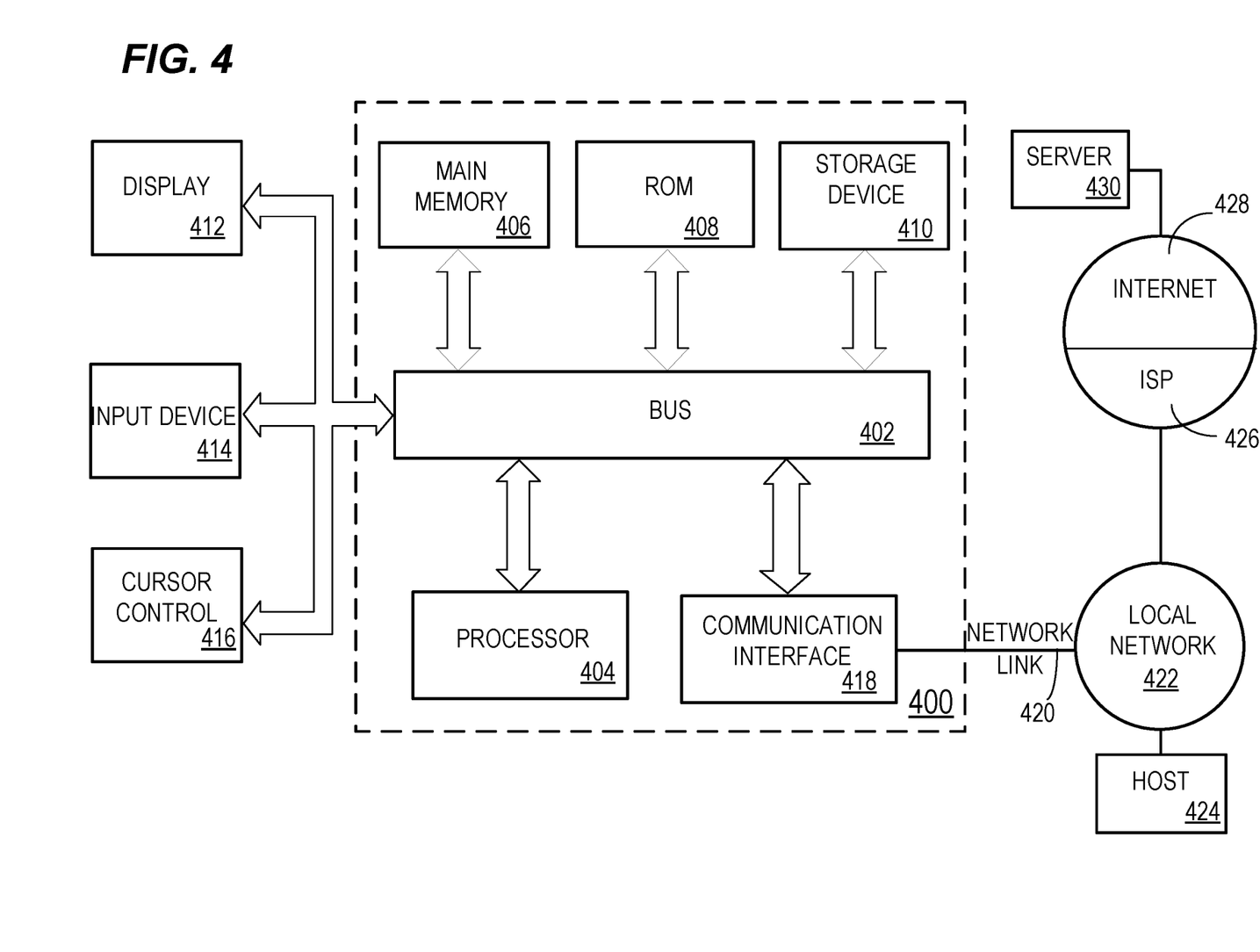
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (for example, x) and a second axis (for example, y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a plurality of requests from one or more content item requesters;
   for each request of the plurality of requests:
   determining a media item to include in a response to said each request;
   causing to be performed a lookup for the media item to a cache stored at one or more data stores;
   receiving a cache response as a result of the lookup, wherein the cache response includes a status indicator for the media item to be stored in the cache, wherein the status indicator is stored in the cache;
   if the status indicator is an in-progress status indicator, then:
   determining, based on the in-progress status indicator, to wait for a period of time, without requesting, from a media item data store, the media item;
   after the period of time has elapsed, causing to be performed another lookup to the cache without requesting, from the media item data store, the media item;

if the status indicator is a failure status indicator, then requesting the media item from the media item data store;
wherein the method is performed by one or more computing devices.

2. The method of claim 1, wherein the status indicator is the in-progress status indicator, further comprising:
after the period of time has elapsed, in response to determining that the other lookup results in a success status indicator, retrieving, from the cache, information on the media item in response to said each request.

3. The method of claim 1, wherein for a second request of the plurality of requests, a second lookup is performed for a second media item that is determined to be included in a second response to the second request, further comprising:
in response to identifying a success status indicator for the second lookup:
determining whether a time to live (TTL) stored in the cache and associated with the second media item has expired;
if the TTL has not expired, then retrieving, from the cache, information on the second media item in response to said second request.

4. The method of claim 1, wherein for a second request of the plurality of requests, a second lookup is performed for a second media item that is determined to be included in a second response to the second request, further comprising:
in response to identifying a failure status indicator for the second lookup:
determining whether a time to live (TTL) stored in the cache and associated with the second media item has expired;
if the TTL has expired:
causing a query to be executed against a second media item data store to retrieve the second media item;
changing the failure status indicator for the second media item in the cache to an in-progress status.

5. The method of claim 4, further comprising:
for the failure status indicator for the second lookup and after changing the failure status indicator:
in response to determining that an executed query returns a valid result:
changing the failure status indicator for the second media item in the cache to a valid status indicator;
updating, in the cache, an entry for the second media item with the valid result of the executed query against the media item data store.

6. The method of claim 4, further comprising:
for a failure status indicator for the lookup and after changing the failure status indicator:
in response to determining that the executed query returns an invalid result:
updating, in the cache, for the second media item, a time to live (TTL) associated with the second media item.

7. The method of claim 1, wherein for a second request of the plurality of requests, a second lookup is performed for a second media item that is determined to be included in a second response to the second request, further comprising:
in response to determining that the second lookup fails to identify the second media item, causing a query to be executed against the media item data store to retrieve the second media item.

8. The method of claim 1, wherein determining the media item to include further comprises determining a media item type and a media item dimension for the media item.

9. The method of claim 1, wherein the media item comprises at least one of a video, a text, or a graphical type of media item.

10. The method of claim 1, further comprising:
determining another media item to include in the response to said each request,
wherein the media item comprises a graphical media item and the other media item comprises a text media item.

11. The method of claim 1, wherein determining the media item includes determining a type the media item may be used when generating a content item in response to said request.

12. The method of claim 1, wherein the media item data store resides on one or more computing devices separate from one or more computing devices that include the cache.

13. The method of claim 1, wherein the media item is represented in the cache including a key, a value, a status indicator, and a time to live (TTL).

14. The method of claim 1, wherein for a second request of the plurality of requests, a second lookup is performed for a second media item that is determined to be included in a second response to the second request, further comprising:
in response to identifying the in-progress status indicator for the second lookup made in response to the second request of the plurality of requests, in response to a subsequent lookup for the second media item resulting in a success status indicator, retrieving, from the cache, information on the second media item in response to the second request.

15. One or more storage media storing instructions which, when executed by one or more processors, cause:
receiving a plurality of requests from one or more content item requesters;
for each request of the plurality of requests:
determining a media item to include in a response to said each request;
causing to be performed a lookup for the media item to a cache residing on one or more data stores;
receiving a cache response as a result of the lookup, wherein the cache response includes a status indicator for the media item to be stored in the cache, wherein the status indicator is stored in the cache;
if the status indicator is an in-progress status indicator, then:
determining, based on the in-progress status indicator, to wait for a period of time, without requesting, from a media item data store, the media item;
after the period of time has elapsed, causing to be performed another lookup to the cache without requesting, from the media item data store, the media item;
if the status indicator is a failure status indicator, then requesting the media item from the media item data store.

16. The one or more storage media of claim 15, wherein the status indicator is the in-progress status indicator, wherein the instructions, when executed by the one or more processors, further cause:
after the period of time has elapsed, in response to determining that the other lookup results in a success status indicator, retrieving, from the cache, information on the media item in response to said each request.

17. The one or more storage media of claim 15, wherein for a second request of the plurality of requests, a second lookup is performed for a second media item that is determined to be included in a second response to the second request, wherein the instructions, when executed by the one or more processors, further cause:
in response to identifying a failure status indicator for the second lookup:
determining whether a time to live (TTL) stored in the cache and associated with the second media item has expired;
if the TTL has expired:
causing a query to be executed against a second media item data store to retrieve the second media item;
changing the failure status indicator for the second media item in the cache to an in-progress status.

18. A system comprising:
one or more processors;
one or more data stores including a cache used to store results of requests made to a media item data store;
one or more storage media storing instructions which, when executed by the one or more processors, cause:
receiving a plurality of requests from one or more content item requesters;
for each request of the plurality of requests:
determining a media item to include in a response to said each request;
causing to be performed a lookup for the media item to a cache residing on one or more data stores;
receiving a cache response as a result of the lookup, wherein the cache response includes a status indicator for the media item to be stored in the cache, wherein the status indicator is stored in the cache;
if the status indicator is an in-progress status indicator, then:
determining, based on the in-progress status indicator, to wait for a period of time, without requesting, from the media item data store, the media item;
after the period of time has elapsed, causing to be performed another lookup to the cache without requesting, from the media item data store, the media item;
if the status indicator is a failure status indicator, then requesting the media item from the media item data store.

19. The system of claim 18, wherein for a second request of the plurality of requests, a second lookup is performed for a second media item that is determined to be included in a second response to the second request, wherein the instructions, when executed by the one or more processors, further cause:
in response to determining that the second lookup fails to identify the second media item, causing a query to be executed against the media item data store to retrieve the second media item.

20. The system of claim 18, wherein determining the media item to include further comprises determining a media item type and a media item dimension for the media item.

\* \* \* \* \*